(12) United States Patent
Chiproot

(10) Patent No.: US 11,067,206 B2
(45) Date of Patent: Jul. 20, 2021

(54) PIPE COUPLING WITH GROOVED COUPLING AND GRIP RING

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 286 days.

(21) Appl. No.: 16/039,493

(22) Filed: Jul. 19, 2018

(65) Prior Publication Data
US 2020/0025316 A1 Jan. 23, 2020

(51) Int. Cl.
*F16L 21/06* (2006.01)
*F16L 21/03* (2006.01)

(52) U.S. Cl.
CPC ............. *F16L 21/065* (2013.01); *F16L 21/03* (2013.01)

(58) Field of Classification Search
CPC ....... F16L 21/065; F16L 21/03; F16L 37/091; F16L 17/04; F16L 21/08
USPC ................................. 285/243, 322–323, 373
See application file for complete search history.

(56) References Cited

U.S. PATENT DOCUMENTS

| | | | | |
|---|---|---|---|---|
| 2,457,438 A * | 12/1948 | Bennett | ................... | F16L 17/04 285/112 |
| 3,414,297 A * | 12/1968 | Pollia | .................. | F16L 23/0286 285/98 |
| 4,448,448 A * | 5/1984 | Pollia | ...................... | F16L 23/18 285/112 |
| 5,921,588 A * | 7/1999 | Vogel | .................... | F16L 19/086 285/23 |
| 6,832,791 B2 * | 12/2004 | Legeai | .................. | F16L 21/065 285/341 |
| 7,837,238 B2 * | 11/2010 | Krausz | .................. | F16L 19/061 285/323 |
| 8,091,932 B2 * | 1/2012 | Nijsen | ..................... | F16L 21/04 285/421 |
| 8,960,729 B2 * | 2/2015 | Chiproot | ............... | F16L 21/065 285/421 |
| 2006/0103136 A1 * | 5/2006 | Krengel | ................ | F16L 13/147 285/371 |
| 2009/0140520 A1 * | 6/2009 | Krausz | .................. | F16L 21/065 285/340 |
| 2010/0171303 A1 * | 7/2010 | Krausz | ................ | F16L 27/0849 285/184 |
| 2010/0176588 A1 * | 7/2010 | Krausz | .................. | F16L 19/083 285/339 |
| 2011/0031737 A1 * | 2/2011 | Krausz | ..................... | F16L 21/08 285/15 |
| 2011/0148105 A1 * | 6/2011 | Nijsen | ..................... | F16L 21/04 285/339 |

(Continued)

*Primary Examiner* — Matthew Troutman
*Assistant Examiner* — Fannie C Kee
(74) *Attorney, Agent, or Firm* — Dekel Patent Ltd.; David Klein

(57) ABSTRACT

A pipe coupling includes a pipe housing formed with an annular groove spaced axially from a first end of the pipe housing, a grooved coupling including a ring member that includes a coupling key received in the annular groove, and a grip ring assembly positioned at a second end of the pipe housing opposite to the first end. The grip ring assembly includes two clamp members arranged to be fastened and tightened towards each other by a fastener.

7 Claims, 2 Drawing Sheets

(56) References Cited

U.S. PATENT DOCUMENTS

2013/0154259 A1* 6/2013 Chiproot .............. F16L 21/065
285/337

* cited by examiner

PIPE COUPLING WITH GROOVED COUPLING AND GRIP RING

FIELD OF THE INVENTION

The present invention relates generally to pipe couplings, and particularly to a pipe coupling with a grooved coupling and grip ring.

BACKGROUND OF THE INVENTION

Mechanical couplings for joining pipe elements together end-to-end have interconnectable segments that are positioned circumferentially around the ends of co-axially aligned pipe elements. The term "pipe element" is used herein to describe any pipe-like item or component having a pipe like form. Pipe elements include, without limitation, pipe stock, pipe fittings such as elbows, caps and tees as well as fluid control components such as valves, reducers, strainers, restrictors, pressure regulators and the like.

Grooved couplings have rims that act as keys that engage circumferential grooves that extend around each of the pipe elements to be joined. Engagement between the coupling keys and the grooves on the pipe elements provides mechanical restraint to the joint and ensures that the pipe elements remain coupled even under high internal pressure and external forces. The grooved coupling has an annular channel that receives a gasket or seal, typically an elastomeric ring, which engages the ends of each pipe element and provides a fluid tight seal.

A problem with grooved connections is that they are fine if the two pipe elements are perfectly collinear; for example, the two pipe elements lie perfectly on the same exact horizontal line. However, in real life situations, nothing is perfect and there are deviations from the exact horizontal. These deviations create stresses in the pipe elements and compromise the integrity of the watertight seal that should be provided by the grooved coupling.

SUMMARY OF THE INVENTION

The present invention seeks to provide a novel pipe coupling with a grooved coupling at one end and a grip ring at an opposite end, as is described more in detail hereinbelow. Surprisingly, the addition of the grip ring has been found to enable the coupling to withstand a wide range of deviations from a perfect collinear match between pipe elements while maintaining a proper watertight seal even under dynamic flow conditions.

There is thus provided in accordance with an embodiment of the present invention a pipe coupling including a pipe housing formed with an annular groove spaced axially from a first end of the pipe housing, a grooved coupling including a ring member that includes a coupling key received in the annular groove, and a grip ring assembly positioned at a second end of the pipe housing opposite to the first end, the grip ring assembly including two clamp members arranged to be fastened and tightened towards each other by a fastener.

In accordance with an embodiment of the present invention the clamp members include an annular inclined surface that slopes downwards towards an open outer face thereof and the grip ring assembly is received inside an inner contour of the annular inclined surface.

In accordance with an embodiment of the present invention the grip ring assembly includes wedge-shaped grippers arranged for sliding and abutting against the annular inclined surface.

In accordance with an embodiment of the present invention the wedge-shaped grippers are connected to one another by flexible elements.

In accordance with an embodiment of the present invention the second end of the pipe housing includes an elastomeric seal member received in an annular channel defined by an annular portion of the clamp members, a face of the second end and an annular divider positioned between the elastomeric seal member and the grip ring assembly.

In accordance with an embodiment of the present invention an outer annular rim of the ring member forms the coupling key.

In accordance with an embodiment of the present invention the grooved coupling includes an annular seal.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
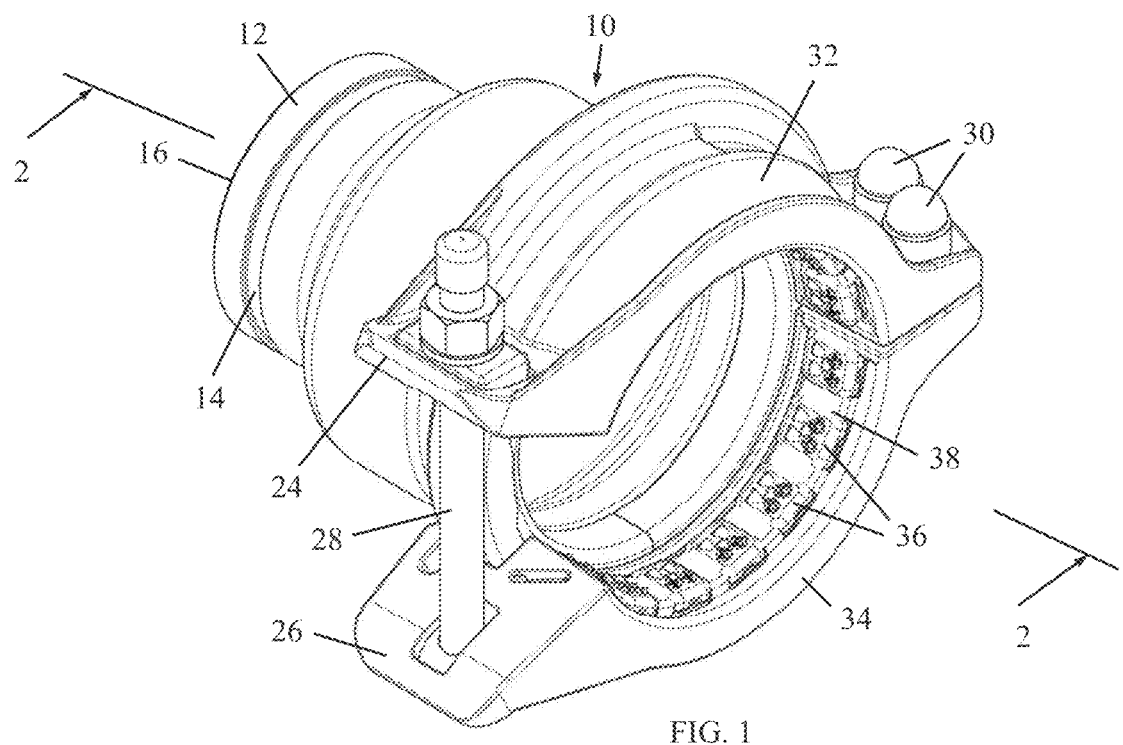
FIG. 1 is a simplified pictorial illustration of a pipe coupling, constructed and operative in accordance with an embodiment of the present invention.
Figure 2:
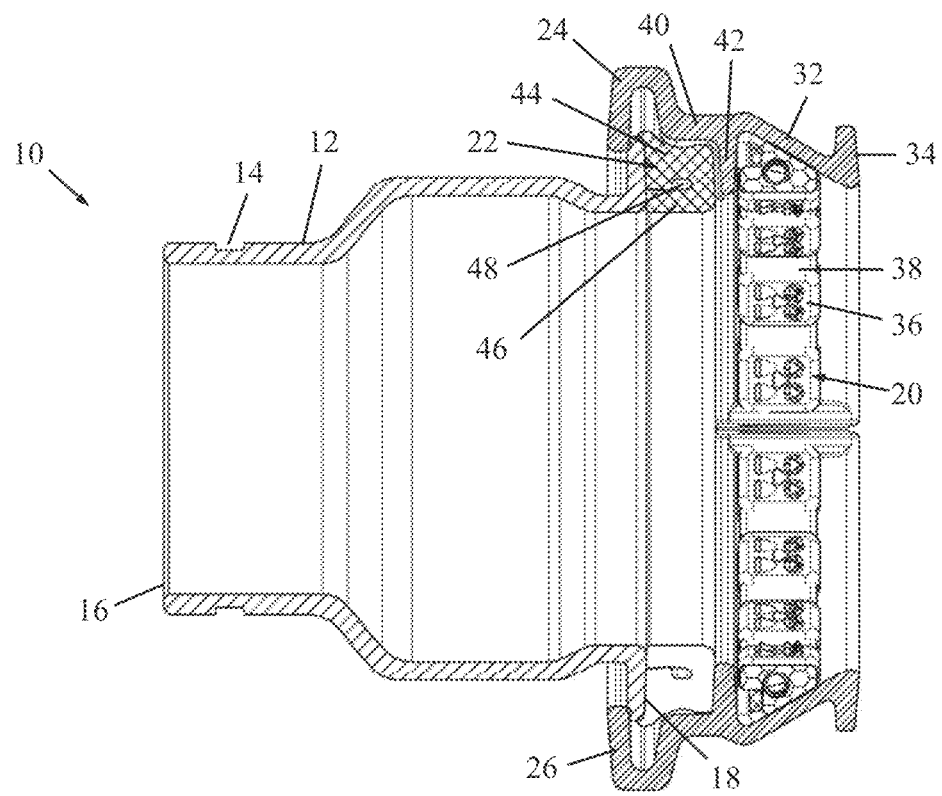
FIG. 2 is a simplified sectional illustration of the pipe coupling of FIG. 1, taken along lines 2-2 in FIG. 1.

Reference is now made to FIGS. 1 and 2, which illustrate a pipe coupling 10, constructed and operative in accordance with a non-limiting embodiment of the present invention.

Pipe coupling 10 includes a pipe housing 12 formed with an annular groove 14 spaced axially from a first end 16 of pipe housing 12. The annular groove 14 is designed to receive keys of a grooved coupling, as is explained below.

Pipe coupling 10, at an opposite end 18 of pipe housing 12 (i.e., second end 18 is opposite to first end 16), includes a grip ring assembly 20, or alternatively an elastomeric seal member 22 plus the grip ring assembly 20 as one unit.

The grip ring assembly 20 includes two clamp members 24 and 26 (FIG. 1), which may be fastened and tightened towards each other by a fastener 28. The two clamp members 24 and 26 may extend continuously from each other, or may be hinged to each other, opposite to fastener 28; alternatively, as in the illustrated embodiment, clamp members 24 and 26 may be secured to each other opposite to first fastener 28 by a second fastener or fasteners 30.

The clamp members 24 and 26 include an annular inclined surface 32 (FIG. 2) that slopes downwards towards its open outer face 34. The grip ring assembly 20 is received inside the inner contour of annular inclined surface 32. The grip ring assembly 20 includes a plurality of wedge-shaped grippers 36, which are arranged for sliding and abutting against annular inclined surface 32. The wedge-shaped grippers 36 may be connected to one another by flexible elements 38 to form the grip ring 20. The first fastener 28 fastens clamp members 24 and 26 towards each other in a direction transverse to the axial length of the assembly so as to apply a radially-inward clamping force on annular inclined surface 32 that moves and wedges the wedge-shaped grippers 36 in an axial direction between annular inclined surface 32 and a pipe (not shown) inserted through grip ring 20.

As described in U.S. Pat. No. 9,835,277, each of the wedge-shaped grippers 36 may include a static wedge, which is fixed to clamp members 24 and 26, and a movable wedge arranged to slide over the static wedge in the axial direction (i.e., in the direction of the axial length of the pipe coupling 10). Each wedge-shaped gripper 36 may be provided with an array of large and small gripping teeth, and the teeth may be oriented to bite into the surface of the pipe in different directions. The sharp edges of all teeth face outwards. The large teeth project outwards further than the small teeth. The small teeth may be shaped as a cluster of pointed barbs, whereas the large teeth may be shaped as oval grater barbs; other shapes may also be used.

The elastomeric seal member 22 may be received in an annular channel defined by an annular portion 40 (FIG. 2) of clamp members 24 and 26, opposite end face 18 of pipe housing 12 and an annular divider 42 positioned between elastomeric seal member 22 and grip ring 20.

The elastomeric seal member 22 may include an outer portion 44 folded over an inner portion 46 so as to define an inner space 48 between and bounded by the outer and portions 44 and 46. The inner space 48 is in fluid communication with a fluid (not shown) flowing in the pipe (not shown). The fluid enters inner space 48 and applies pressure therein to increase tightening of the seal.

When the first fastener 28 fastens clamp members 24 and 26 towards each other in a direction transverse to the axial length of the assembly, fastener 28 applies a radially-inward clamping force on elastomeric seal member 22 so that seal 22 seals against the pipe (not shown) inserted through grip ring 20 and elastomeric seal member 22.

Figure 3:
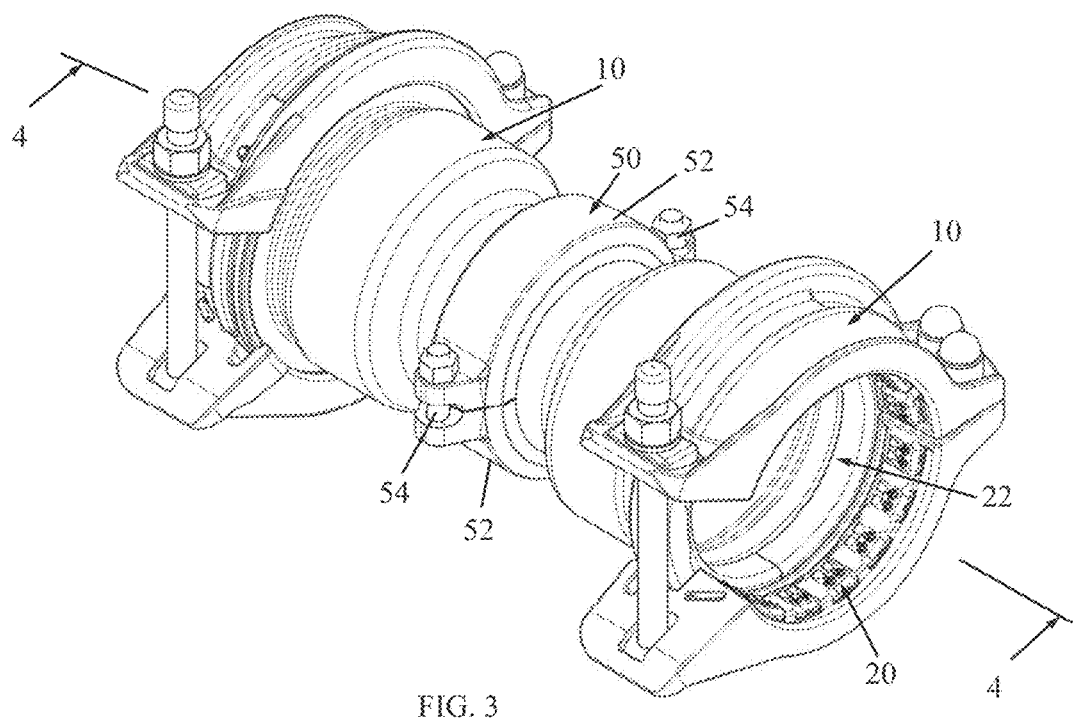
FIG. 3 is a simplified pictorial illustration of two pairs of pipe couplings coupled together with a grooved coupling, in accordance with another embodiment of the present invention.
Figure 4:
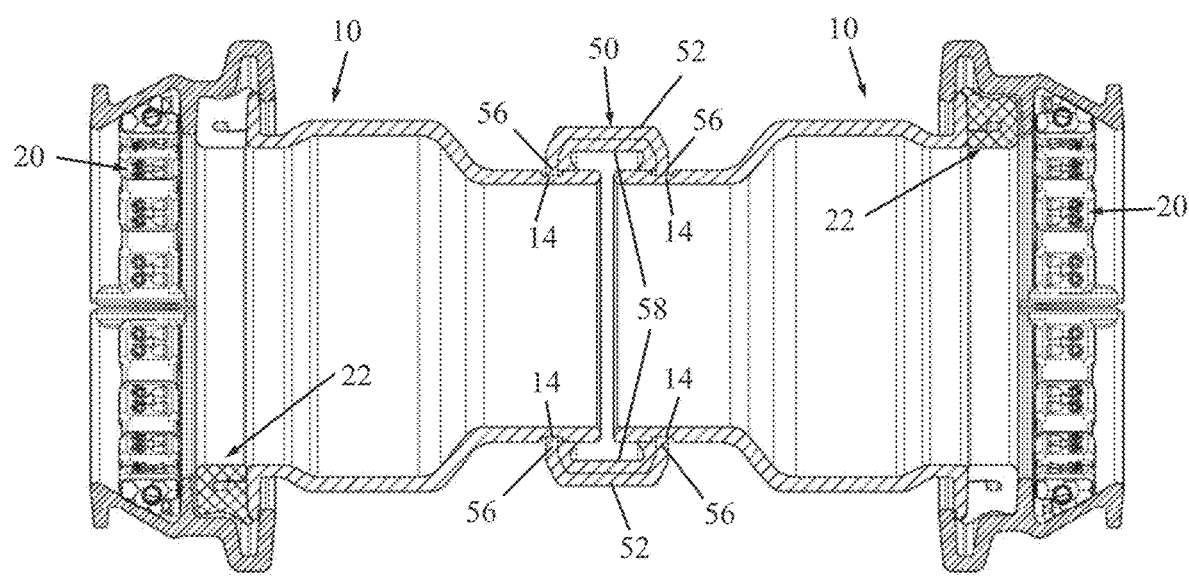
FIG. 4 is a simplified sectional illustration of the pipe coupling assembly of FIG. 3 taken along lines 4-4 in FIG. 3.

Reference is now made to FIGS. 3 and 4, which illustrate two pairs of pipe couplings 10 coupled together with a grooved coupling 50, in accordance with a non-limiting embodiment of the present invention.

Grooved coupling 50 includes two partial ring members 52 secured to each other by fasteners 54. Outer annular rims of the ring members 52 form coupling keys 56 that are received in grooves 14. An annular seal 58 is positioned inside the ring members 52 and seals the connection between the pipe couplings 10 when fasteners 54 are tightened.

Of course, alternatively, the grooved coupling 50 can couple the pipe coupling 10 to other grooved pipe elements, including without limitation, pipe stock, pipe fittings such as elbows, caps and tees as well as fluid control components such as valves, reducers, strainers, restrictors, pressure regulators and the like.

Surprisingly, the addition of the grip ring 20 has been found to enable the entire assembly that includes the pipe couplings 10 and grooved coupling 50 to withstand a wide range of deviations from a perfect collinear match between pipe elements while maintaining a proper watertight seal even under dynamic flow conditions.

What is claimed is:

1. An assembly comprising:
    a pipe coupling comprising a pipe housing formed with an annular groove spaced axially from a first end of said pipe housing, wherein said annular groove is formed in said pipe housing between equal-diameter cylindrical portions of said pipe housing, one of said equal-diameter cylindrical portions extending from said first end of said pipe housing to a first annular edge of said annular groove, said first annular edge being spaced axially from said first end of said pipe housing;
    a grooved coupling comprising a ring member that comprises a coupling key received in said annular groove; and
    a grip ring assembly positioned at a second end of said pipe housing opposite to said first end, said grip ring assembly being coupled to two clamp members arranged to be fastened and tightened towards each other by a fastener; and
    wherein said second end of said pipe housing comprises an elastomeric seal member contained within an annular channel defined by an annular portion of said two clamp members, a face of said second end and an annular divider positioned between said elastomeric seal member and said grip ring assembly, and wherein said seal member does not extend past said annular divider.

2. The assembly according to claim 1, wherein cm, of said two clamp members comprise an annular inclined surface that slopes downwards towards an open outer face thereof and said grip ring assembly is received inside an inner contour of one of said annular inclined surfaces.

3. The assembly according to claim 2, wherein said grip ring assembly comprises wedge-shaped grippers arranged for sliding and abutting against said annular inclined surface.

4. The assembly according to claim 3, wherein said wedge-shaped grippers are connected to one another by flexible elements.

5. The assembly according to claim 1, wherein an outer annular rim of said ring member forms said coupling key.

6. The assembly according to claim 1, wherein said grooved coupling comprises an annular seal.

7. The assembly according to claim 1, wherein said equal-diameter cylindrical portions of said pipe housing have an identical thickness, and said pipe housing at said annular groove has a thickness less than said identical thickness.

* * * * *